(12) United States Patent
Tilly et al.

(10) Patent No.: US 12,217,307 B1
(45) Date of Patent: Feb. 4, 2025

(54) VIRTUAL TRADING FLOOR

(71) Applicant: Cboe Exchange, Inc., Chicago, IL (US)

(72) Inventors: Edward T. Tilly, Chicago, IL (US); Robert Hocking, Downers Grove, IL (US); Brent Coonrod, Overland Park, KS (US); Jordan Newmark, Evanston, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 17/237,759

(22) Filed: Apr. 22, 2021

Related U.S. Application Data

(60) Provisional application No. 63/073,309, filed on Sep. 1, 2020, provisional application No. 63/013,908, filed on Apr. 22, 2020.

(51) Int. Cl.
*G06Q 40/04* (2012.01)
*G06T 19/00* (2011.01)
*H04L 12/18* (2006.01)

(52) U.S. Cl.
CPC ........... *G06Q 40/04* (2013.01); *G06T 19/003* (2013.01); *H04L 12/1822* (2013.01)

(58) Field of Classification Search
CPC ....... G06Q 40/04; G06T 19/003; G06T 19/00; H04L 12/1822; H04L 12/15; H04L 12/18
See application file for complete search history.

(56) References Cited

U.S. PATENT DOCUMENTS

| | | | |
|---|---|---|---|
| 7,020,632 B1 * | 3/2006 | Kohls | G06Q 40/06 |
| | | | 705/37 |
| 7,478,129 B1 | 1/2009 | Chemtob | |
| 8,640,946 B1 | 2/2014 | Block et al. | |
| 11,928,731 B1 * | 3/2024 | Pedersen | H04L 67/12 |

(Continued)

FOREIGN PATENT DOCUMENTS

| | | | | |
|---|---|---|---|---|
| WO | WO-0042552 A2 * | 7/2000 | | G06Q 40/04 |
| WO | WO 2013062509 | 5/2013 | | |

OTHER PUBLICATIONS

Notice of Allowance in U.S. Appl. No. 17/227,018, dated Nov. 7, 2023, 13 pages.

(Continued)

*Primary Examiner* — Kenneth Bartley
(74) *Attorney, Agent, or Firm* — Fish & Richardson P.C.

(57) ABSTRACT

A method is provided for a virtual floor trading implemented via an exchange computer system. The method includes maintaining a virtual environment that facilitates audio-visual interaction between a plurality of remote market participants; establishing a secure connection with a computing device; receiving, from the computing device, information relating to a financial instrument transaction order; providing the information relating to the financial instrument transaction order to the plurality of remote market participants; receiving a response to the financial instrument transaction order from at least one remote market participant from among the plurality of remote market participants; providing information relating to the response to the plural- (Continued)

ity of remote market participants; and facilitating a transaction based on the information relating to the financial instrument transaction order, the information relating to the response, and one or more order matching rules.

14 Claims, 11 Drawing Sheets

(56) References Cited

U.S. PATENT DOCUMENTS

| | | | |
|---|---|---|---|
| 2002/0038279 A1 | 3/2002 | Samuelson et al. | |
| 2002/0111893 A1* | 8/2002 | Shifrin-Cassidy | G06Q 30/02 705/37 |
| 2002/0133449 A1* | 9/2002 | Segal | G06T 11/206 705/37 |
| 2003/0126068 A1* | 7/2003 | Hauk | G06Q 30/08 705/37 |
| 2004/0044614 A1* | 3/2004 | Wagner | G06Q 40/04 705/37 |
| 2004/0186806 A1* | 9/2004 | Sinclair | G06Q 40/04 705/37 |
| 2005/0234813 A1* | 10/2005 | West | G06Q 40/04 705/37 |
| 2006/0004646 A1* | 1/2006 | Schoen | G06Q 30/0275 705/37 |
| 2007/0168359 A1* | 7/2007 | Jacob | G10L 13/033 |
| 2008/0120150 A1* | 5/2008 | McSheffrey | G06Q 10/00 705/7.29 |
| 2009/0164359 A1* | 6/2009 | Loui | G06Q 30/08 705/37 |
| 2009/0254843 A1* | 10/2009 | Van Wie | H04L 67/131 707/999.005 |
| 2009/0318234 A1* | 12/2009 | Christensen | A63F 13/533 463/42 |
| 2010/0191640 A1 | 7/2010 | Tilly et al. | |
| 2011/0093348 A1* | 4/2011 | Hudson | G06Q 50/01 705/14.73 |
| 2011/0307400 A1* | 12/2011 | Chang | G06F 16/29 709/204 |
| 2012/0016926 A1 | 1/2012 | Toga et al. | |
| 2013/0054690 A1* | 2/2013 | Wei | G06Q 10/109 709/204 |
| 2013/0271456 A1* | 10/2013 | Haswell | G06T 19/003 345/420 |
| 2014/0047027 A1* | 2/2014 | Moyers | G06F 9/452 709/204 |
| 2015/0073970 A1 | 3/2015 | Merold et al. | |
| 2015/0127509 A1* | 5/2015 | Studnitzer | G06Q 40/04 705/37 |
| 2016/0180447 A1 | 6/2016 | Kamalie et al. | |
| 2016/0196596 A1* | 7/2016 | Van Wie | H04L 12/1813 705/26.41 |
| 2017/0195266 A1* | 7/2017 | Moyers | H04L 51/216 |
| 2019/0205727 A1 | 7/2019 | Lin et al. | |
| 2020/0162617 A1* | 5/2020 | Hasegawa | H04L 67/025 |
| 2020/0265517 A1* | 8/2020 | Kim | G06Q 40/04 |
| 2020/0320623 A1* | 10/2020 | McGrath | G06Q 40/04 |
| 2020/0328908 A1* | 10/2020 | Howland | H04W 12/50 |
| 2020/0334750 A1* | 10/2020 | Mohanraj | G06Q 40/06 |
| 2022/0124283 A1* | 4/2022 | Krol | G06F 30/13 |

OTHER PUBLICATIONS

Hofman-Kohlmeyer, "Research potential in virtual worlds. an example of Second Life," World Scientific News WSN, 2017, 89:225-230.

* cited by examiner

| TIME | BRK | TYPE | EXPIRATION (DIRECTION) STRIKE |
|---|---|---|---|
| 14:14:17 | KOW | CMBO | SPX V16 3100p (50) X20 3400c (-50) 3575c (50) Z18 3380c (17) 3380p (-17) |
| 14:11:36 | KOW | CMBO | SPX V16 3300p (25) 3575c (-50) Z18 3375c (12) 3375p (-12) |
| 14:08:38 | KOW | PUT | SPXW V07 3050p (1) |
| 13:58:11 | KOW | CMBO | SPX V16 3000p (25) Z18 3370c (1) 3370p (-1) |

LEGEND: [COMPLEX] [SIMPLE]  MEETING: ZONE 7  ○ CONNECTED 13:14:47

```
┌─────────────────────────────────────────────────────────────┐
│ MAINTAIN A VIRTUAL ENVIRONMENT THAT FACILITATES AUDIO-VISUAL │
│ INTERACTION BETWEEN A PLURALITY OF REMOTE MARKET PARTICIPANTS│
│                                                         510  │
└─────────────────────────────────────────────────────────────┘
                              ↓
┌─────────────────────────────────────────────────────────────┐
│    ESTABLISH A SECURE CONNECTION WITH A COMPUTING DEVICE     │
│                                                         520  │
└─────────────────────────────────────────────────────────────┘
                              ↓
┌─────────────────────────────────────────────────────────────┐
│     RECEIVE INFORMATION RELATING TO A FINANCIAL INSTRUMENT   │
│                     TRANSACTION ORDER                        │
│                                                         530  │
└─────────────────────────────────────────────────────────────┘
                              ↓
┌─────────────────────────────────────────────────────────────┐
│ PROVIDE THE INFORMATION RELATING TO THE FINANCIAL INSTRUMENT │
│  TRANSACTION ORDER TO THE PLURALITY OF REMOTE MARKET         │
│                     PARTICIPANTS                        540  │
└─────────────────────────────────────────────────────────────┘
                              ↓
┌─────────────────────────────────────────────────────────────┐
│ RECEIVE A RESPONSE TO THE FINANCIAL INSTRUMENT TRANSACTION   │
│ ORDER FROM AT LEAST ONE REMOTE MARKET PARTICIPANT FROM       │
│ AMONG THE PLURALITY OF REMOTE MARKET PARTICIPANTS       550  │
└─────────────────────────────────────────────────────────────┘
                              ↓
┌─────────────────────────────────────────────────────────────┐
│ PROVIDE INFORMATION RELATING TO THE RESPONSE TO THE PLURALTIY│
│            OF REMOTE MARKET PARTICIPANTS                     │
│                                                         560  │
└─────────────────────────────────────────────────────────────┘
                              ↓
┌─────────────────────────────────────────────────────────────┐
│                   FACILITATE A TRANSACTION                   │
│                                                         570  │
└─────────────────────────────────────────────────────────────┘
```

FIG. 5

VIRTUAL TRADING FLOOR

CROSS-REFERENCE TO RELATED APPLICATION

This application claims the benefit of U.S. Provisional Patent Application No. 63/013,908, filed Apr. 22, 2020, and U.S. Provisional Patent Application No. 63/073,309, filed Sep. 1, 2020, both of which are incorporated herein by reference in their entirety.

TECHNICAL FIELD

This application relates to technology for trading financial instruments in electronic exchanges, including exchanges that combine electronic and open-outcry trading mechanisms.

BACKGROUND

In response to the COVID-19 pandemic, many exchanges shut down their trading floors. The shutdowns were necessary in view of overriding public health interests, but they came at significant cost. For example, the temporary suspension of open-outcry trading mechanisms in view of the unprecedented requirement for physical (or "social") distancing eliminated an enormous pool of information that market makers and brokers need in order to provide tight, deep markets in the world's most utilized financial instruments. Those same conditions reduced market liquidity, increased the risks faced by individual market makers to the point that many lost their businesses, and increased broker ticket prices to levels that were unsustainable for many customers.

In this way, the COVID-19 pandemic revealed that it can no longer be taken for granted that the physical trading floors on which open-outcry trading has traditionally taken place will remain consistently available to authorized market participants.

Beyond that concern, the traditional requirement that all open-outcry trading associated with an exchange be performed on the exchange's physical trading floor has limited the effectiveness of open-outcry mechanisms as a means for safely and fairly distributing information to market participants. The clamor of activity within a trading crowd can, for example, make it difficult for a particular market participant to hear or be heard, and physical altercations have been known to occur over the physical positioning of market participants in the trading crowd on some trading floors.

SUMMARY

The disclosure that follows relates to a Virtual Trading Floor ("VTF") implemented via an exchange computer system. The VTF provides remote trading floor connectivity and collaborative tools. In one aspect, the connectivity and collaborative tools enable an approved and monitored virtual trading floor that eliminates the need for physical presence, thereby protecting participants and serving public health interests, while at the same time restoring much-need market liquidity.

Each market participant connected to the VTF can be represented within the VTF by a virtual trader, and can engage in open-outcry trading practices facilitated through the VTF that are similar to open-outcry trading practices performed on physical trading floors. Market participants can enter orders within the VTF, and these orders can be matched and executed by the exchange computer system in a manner similar to orders received by the exchange computer system from other sources. Each market participant is responsible for orders entered via the VTF pursuant to the rules of the exchange. The VTF can be used to trade financial instruments including, but not limited to, securities, commodities, and other financial products.

Among other advantages, the VTF enables market participants to trade from remote locations in a virtual environment that resembles a physical trading floor. The VTF enables market participants to conduct open-outcry trading in reliance on observations of, and interactions with, other traders within the VTF, without being subject to the burdens and hazards of traveling to, and being physically present on, a physical trading floor.

According to some aspects, a method for virtual floor trading is implemented via an exchange computer system, and includes maintaining a virtual environment that facilitates audio-visual interaction between a plurality of remote market participants. The method also includes establishing a secure connection with a computing device, receiving, from the computing device, information relating to a financial instrument transaction order, and providing the information relating to the financial instrument transaction order to the plurality of remote market participants. The method further includes receiving a response to the financial instrument transaction order from at least one remote market participant from among the plurality of remote market participants, providing information relating to the response to the plurality of remote market participants, and facilitating a transaction based on the information relating to the financial instrument transaction order, the information relating to the response, and one or more order matching rules.

One or more implementations can include the following optional features. For example, in some implementations, the exchange computer system provides the information relating to the financial instrument transaction order to the plurality of remote market participants based on a virtual presence of each of the plurality of remote market participants at a specific location within the virtual environment. The specific location within the virtual environment can be determined based on information relating to the financial instrument transaction order, and the virtual presence of each of the plurality of remote market participants at the specific location can be determined based on information received from the plurality of remote market participants.

In some implementations, the method includes causing a graphical user interface of an application running on the computing device to display a map of locations within the virtual environment. In such implementations, the method can also include receiving, from the computing device, data indicating a selection of the specific location within the virtual environment. In some implementations, the specific location within the virtual environment corresponds to a specific location within a physical trading floor.

In some implementations, providing the information relating to the financial instrument transaction order to the plurality of remote market participants includes causing the information relating to the financial instrument transaction order to be displayed within a graphical user interface (GUI) of a teleconferencing application. In some implementations, the graphical user interface of the teleconferencing application is configurable responsive to one or more user inputs.

In some implementations, the information relating to the financial instrument transaction order includes an order time, an order type, an order price, an order expiration, a financial instrument symbol, and a market participant identifier.

In some implementations, the information relating to the response includes text, audio, and/or video received from a responding market participant.

In some implementations, providing the information relating to the response includes, for each of the plurality of remote market participants, determining a volume for providing the information relating to the response based on a position of the remote market participant within the virtual environment.

In some implementations, the information relating to the response includes an action performed within the virtual environment by a virtual representative of a responding market participant. In such implementations, one or more characteristics of the virtual representative can be selected by the responding market participant.

In some implementations, information relating to the response includes an icon overlaid within the virtual environment on a representation of a responding market participant.

In some implementations, the computing device includes a personal computer, a webcam, a headset, and a teleconferencing application; the teleconferencing application can be configured to interface with the exchange computer system. In some implementations, the teleconferencing application is configured to receive a keyboard input, and to enable an action to be performed within the virtual environment in response to the keyboard input.

In some implementations, the computing device is configured to enable a broker to interface with the virtual environment, and is configured to enable the broker to interface with an order matching system of the exchange computer system.

In some implementations, the computing device is remote from the exchange computer system. In such implementations, establishing the secure connection with the computing device includes receiving log-in credentials from the computing device, determining an association between the computing device and an authorized market participant, and establishing a virtual private network (VPN) connection between the computing device and the exchange computer system.

In some implementations, the virtual environment includes a three-dimensional graphical environment.

In some implementations, the exchange computer system is a distributed computer system that includes an order routing system, an order matching system, and a virtual floor engine. In such implementations, the virtual floor engine maintains the virtual environment that facilitates audiovisual interaction between the plurality of remote market participants. The order routing system receives the information relating to a financial instrument transaction order and the information relating to the response, and forwards the information relating to the financial instrument transaction order and the information relating to the response to the order matching system. The order matching system facilitates the transaction based on the information relating to the financial instrument transaction order, the information relating to the response, and the one or more order matching rules.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIGS. 4A-4D are diagrams illustrating additional examples of users participating in a VTF.

FIG. 5 is a flowchart of an example process for implementing a trade through the VTF.

DETAILED DESCRIPTION

Figure 1:
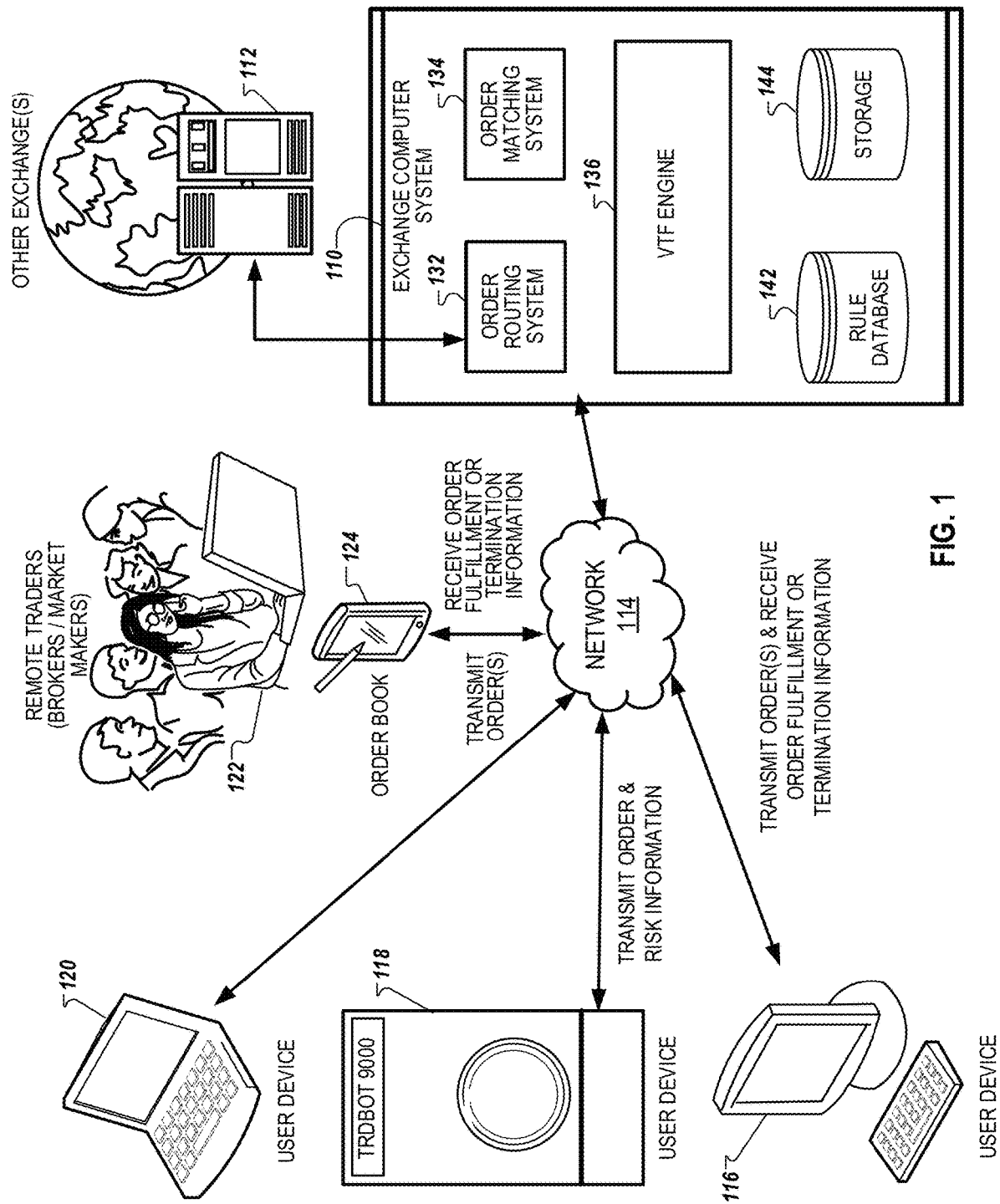
FIG. 1 is a diagram of an example of an exchange computer that implements a VTF and associated networks, devices, and users.

FIG. 1 is a diagram of an exchange computer system and the associated networks, devices, and users that make up an exemplary trading environment in which that system operates. Generally, the term "user" can refer to any entity that interacts with the exchange computer system and/or associated networks and devices. Users can include, for example, market makers and other market participants, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner. The exchange computer system 110 can receive orders from remote electronic devices. The financial instruments that can be traded through the exchange computer system 110 can include securities such as stocks, options, futures, or other derivatives associated with an underlying asset.

Network 114 can connect various components within the trading environment, and is configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or sub-networks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114. These devices can include, for example, a VTF engine 136 of the exchange computer system 110, which can be configured to gather information received from multiple connected market participants and translate that information into a virtual environment that facilitates open-outcry trading among and between the connected market participants. VTF engine 136 can, for example, generate a virtual environment that facilitates audio-visual interaction between a plurality of connected market participants.

VTF engine 136 can, for example, leverage live audio and video transmitted by connected market participants to generate a secure and collaborative audio-visual environment with audio and video quality that rivals the in-person communication experience. The virtual environment can, for example, be organized around a virtual pit that enables traders to engage at known virtual locations, similar to known standing positions in physical trading pits. VTF engine 136 can also generate two-dimensional (2D) and/or three-dimensional (3D) graphical virtual environments incorporating the sights and sounds of a plurality of virtual traders representing the connected market participants.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

The virtual trading floor enables wide market participation. In some implementations, brokers and other traders are able to connect and interact with the exchange computer system via a personal computer or similar device, equipped with an Internet connection, a headset, and a microphone.

User devices 116, 118, and 120 can, for example, include portable or stationary electronic devices, such as smartphones, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

In some implementations, the VTF engine 136 provides for secure remote connectivity via a secure sockets layer (SSL) virtual private network (VPN). In such implementations, user devices 116, 118, and 120 can include public automated routing (PAR) devices connected through the VPN to floor systems.

Remote management software can be used to enable interactions between connected market participants, and orders may be systematized prior to representing via PAR. A technical support team may remotely support software and hardware needs, and a market structure and functionality team may provide user training and support for floor-related questions In some implementations, user devices 116, 118, and 120 can include displays for displaying representations of the VTF. The user devices 116, 118, and 120 can, for example, include or be coupled to components or devices that provision the display of a virtual environment. For example, the user devices 116, 118, and 120 can include or be coupled to graphical displays that include computer monitors. The user devices 116, 118, and 120 can include or be coupled to graphics engines and processors for processing high volumes of data to render information in real time.

The user device 116, 118, or 120 of a particular trader can record and send the trader's speech, image, and actions to the VTF, and can receive and output sights, sounds, and actions corresponding to virtual representations of other traders on the VTF in a manner that provides the trader with a complete visual and audio sensory experience of participating in an operating trading floor. The trader's user device 116, 118, or 120 can include input and output devices that allow the trader to enter into trades with other traders using speech and/or virtual movements such as hand signals and other gestures. As described in more detail below, the trader's user device 116, 118, or 120 can include various suitable hardware or software for displaying and rendering the VTF and for facilitating the trader's interactions on the VTF.

For example, a trader's user device 116, 118, or 120 can include or be connected to display monitors and speakers to output a graphical view and audio of the VTF to the trader. The trader's user device 116, 118, or 120 can include or be connected to one or more microphones, cameras, gyroscopes, and/or sensors to record the trader's speech and movements for transmission to a VTF engine 136 in an exchange computer system 110. If the trader's user device 116, 118, or 120 is portable, the trader's user device 116, 118, or 120 may record the trader's movement and report such movement in the VTF. In addition, or alternatively, such movements may be indicated by mouse, keyboard, or controller inputs. Accordingly, the trader's user device 116, 118, or 120 can be utilized as a user interface with the VTF.

In some implementations, a trader can select one or more types of inputs, movements, gestures that can be recorded and used for manipulating a representation of the trader in the VTF. The selection can be made using various suitable input devices including, but not limited to, a mouse, keyboard, pilot pen, or a user's finger. In some cases, instead of using the trader's actual movements and speech, the motions and speech of virtual traders are comprised partially or wholly of instructions from the trader for the trader's virtual representation to engage in certain movements, speech, or trading activity on the VTF. To facilitate the selection, a graphical user interface can be provided on user device 116, 118, or 120 that would allow a trader to partially or wholly control the trader's presence on the VTF by selecting from a pre-established list of instructions. The instructions may allow the trader to select and control the types of actions or speech the trader would like to engage in on the VTF and/or to achieve a particular result with or without the trader engaging in particular actions or speech. Such an interface can allow a trader to change his or her view of the VTF at the trader's discretion or as determined by a trading activity. This interface can also allow a trader to be sitting down in reality but to be represented within the VTF by a standing virtual trader.

User devices 116, 118, and 120 can transmit user input such as order information or risk information to the exchange computer system 110, and can also receive data from the exchange computer system 110 indicating that an order has been filled or canceled.

Users such as market makers/brokers 122 can also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, the VTF engine 136, a database 142 of trading rules and algorithms, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 can, for example, receive order or quote information for the purchase or sale of financial instruments from one or more user devices 116, 118, and 120. In some implementations, the ORS 132 can also be connected to or include an electronic public automated routing (PAR) system that is accessible by brokers connected to the VTF.

Upon receiving an order or quote the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to a matching system (OMS) 134.

The OMS 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the OMS 134 can mark the matched order or quote with a broker-specific identifier so that the broker sending the order or quote information can be identified.

Orders matched by OMS 134 can for example, originate from within the VTF implemented by the exchange computer system 110, from other components of the exchange computer system 110, and/or from systems that are connected to the exchange computer system 110.

A VTF engine 136 can be implemented via the exchange computer system 110, and/or in another system that is connected to the exchange computer system 110 via network 114. The VTF engine 136 can include hardware and software for facilitating the rendering of the VTF at one or more user devices 116, 118, and 120. In some implementations, the VTF engine 136 can be configured to obtain data reflective of a physical trading floor, to obtain data indicative of traders' presence and actions within the physical trading floor, and to provide data for rendering a VTF at one or more user devices 116, 118, and 120. The VTF engine 136 can include an virtual trader database and a graphics engine.

The virtual trader database can store data for virtual representations of traders who are members of the exchange system. In some implementations, data for graphical representations of any person (including, e.g., visitors) present on a physical trading floor or the VTF can be stored in the virtual trader database. Traders can be graphically represented in various ways. For example, in some implementations, a market participant can design or select an avatar to be used as the trader's graphical representative within the VTF. The avatar can be, for example, an image of a character, creature, or other animate or inanimate object.

In some implementations, the trader can provide images of the trader (such as images of the trader's face and body) that can be used by the VTF engine 136 or software on the trader's user device 116, 118, or 120 to generate a graphical representation of the trader. Data used for generating a trader's graphical representation can be stored in the virtual trader database, and can be provided to other components of the VTF engine 136 and/or user devices 116, 118, and 120.

The VTF engine 136 can generate virtual representations of the VTF and can send data to user devices 116, 118, and 120 for configuring a display of the VTF on the user devices 116, 118, and 120. For example, the VTF engine 136 can obtain continuous or periodic real time images of a physical trading floor and generate views of the physical trading floor and send data for rendering the views of the physical trading floor to the user devices 116, 118, and 120. In this way, real time views reflective of various aspects of the trading floor such as lighting or furniture arrangement, can be accurately reflected in a virtual representation of the physical trading floor. The VTF engine 136 can, for example, utilize any suitable coordinate system to assign coordinates to map each point in the VTF to the physical trading floor. The coordinate system can be used to place various objects such as furniture and bodies of traders, and to measure and implement movements of traders in the VTF.

In addition, or alternatively, the VTF engine 136 may render a VTF that is visually distinct from the physical trading floor.

The VTF engine 136 can represent the VTF and associated virtual traders in various ways. For example, in some implementations, the VTF can be configured to include virtual representations of traders arranged in a particular configuration so that the ability for traders to interact with each other virtually is substantially the same, and such that each trader receives the same configured view of all virtual traders. The VTF engine 136 may alternatively be configured to arrange virtual traders at specific locations within the VTF, such that the experience of a user connected to the VTF varies depending on the placement of the virtual trader corresponding to the user.

The VTF engine 136 can include or be coupled to a database and can communicate with the database and/or user devices to obtain data for rendering virtual representations of a trader. For example, the VTF engine 136 can obtain data for graphically representing a user as a virtual trader within the VTF, and can obtain or generate location data indicating the virtual trader's location within the VTF. The VTF engine 136 can then place the virtual trader at the location within the VTF indicated by the location data.

The VTF engine 136 can also provide data indicative of the activities of one or more virtual traders within the VTF to user devices 116, 118, and 120. For example, audio-visual data indicative of movements or speech of a plurality of virtual traders can be provided to user devices 116, 118, and 120 such that the users of those devices can benefit from listening to real-time conversations and viewing real-time interactions occurring between the virtual traders on the VTF. As noted above, each trader's speech and actions can be recorded by user devices 116, 118, and 120 using sensors, cameras, microphones, and/or other devices. In general, the recording, processing and sending of trader activity and floor activity can be implemented in near real-time or delayed, or accomplished pursuant to a timing scheme required by the rules of the exchange computer system 110.

Storage 144 and database 142 store and handle data in a manner that satisfies the privacy and security requirements of the exchange computer system 110 and its users, and can store one or more of telemetric data, user profiles, user history, and rules and algorithms for matching quotes, bids, and orders. In some implementations, storage 144 may include a database utilized by VTF engine 136.

Database 142 can store data that specifies the rules by which the exchange computer system 110 can operate, as well as specific rules for the operation of VTF engine 136. For example, database 142 can include rules that determine a particular size and shape (including changes in vertical space) of the VTF to optimize trading for a number of traders participating in trading on a particular day. The size and/or shape of the VTF can be generated by rules-based algorithms and, in some cases, can be dependent on certain factors such as the number of participants on the VTF. The database 42 can also store rules for modifying existing requirements and rules of the exchange computer system 110.

In some implementations, the locations of virtual traders on the VTF can be determined by a set of rules or an algorithm based on trader preference, tenure, trading activity or other parameters, or a combination of the foregoing parameters. Additionally, real-time information about the trading activity of other traders on the VTF can be provided to each trader so they would not only have consolidated information about the market from traditional sources, but would also have detailed information about activity occurring within the VTF itself.

To comply with security requirements, upon completion of a trade within the VTF (for example, through automatic execution through the OMS 134), fill information for an order is passed through the OMS 134 and the ORS 132 to one or more user devices 116, 118, and 120. The OMS 134 matches the buy side and sell side of a trade, and forwards the matched trade to a third party organization that verifies the proper clearance of the trade, such as the Options Clearing Corporation (OCC) where the securities can be options, or Depository Trust Company (DTC) where the securities can be equities. The OMS 134 can also format the quote and sale update information and send that information through an internal distribution system that refreshes virtual displays within the VTF, in addition to submitting the information to a quote and trade dissemination service such as, in the case of options, the Options Price Reporting Authority (OPRA). In the case of Equities, the information would be submitted to the Securities Information Processor (SIP).

Figure 2:
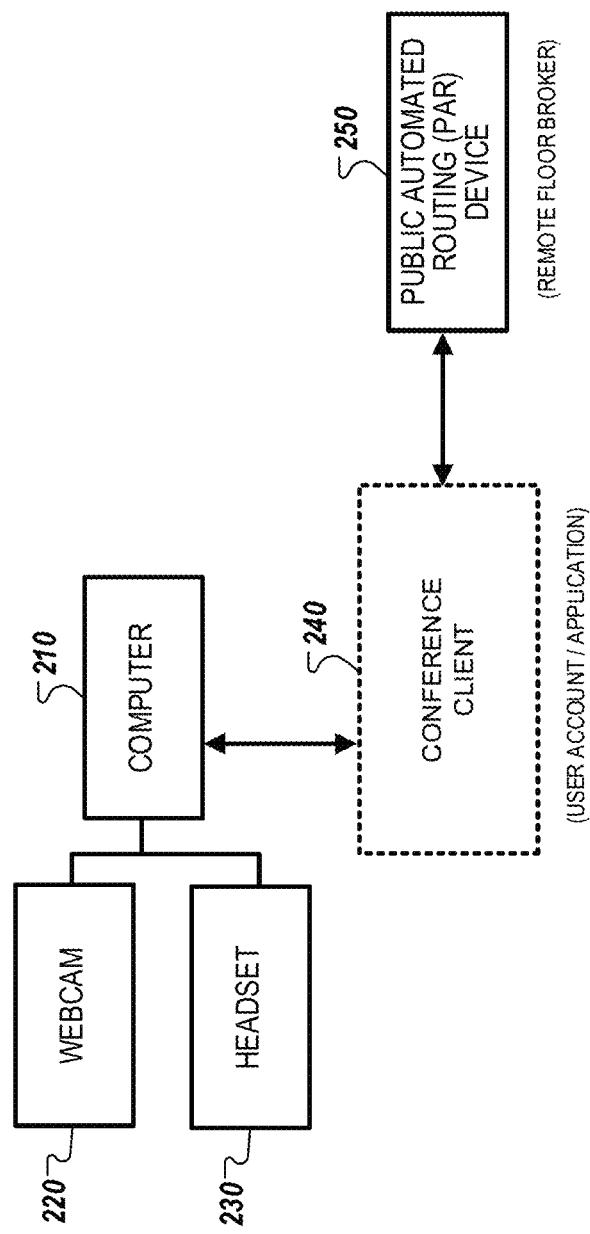
FIG. 2 is a diagram of an example system that enables a user to participate in the VTF.

FIG. 2 is a diagram of an example of a system 200 that enables a user to participate in a virtual trading floor. The system 200 includes various devices, such as computer 210, a webcam 220, a headset 230, and a PAR device 250. The computer 210 is configured run a client application 240 that can be associated with an account of the user.

Computer 210 can include portable or stationary electronic devices, such as smartphones, laptops, desktops, and servers that include user interfaces to display information and receive user input, and that are configured to communicate over a computer network. Computer 210 can communicate with an exchange computer system (e.g., exchange computer system 110) over network 114 using, for example, a proprietary protocol, or a message-based protocol such as financial information exchange (FIX), implemented over TCP/IP.

Computer 210 can be configured with a webcam 220, headset 230, and/or other peripheral devices to allow a user to participate in a VTF through client application 240. For example, a combination of webcam 220, headset 230, a mouse, and a keyboard can allow a user to participate in a VTF and to collaborate with other users via video, audio, and/or chat conferencing. In some implementations, webcam 220 and an associated microphone are integrated into computer 210, for example, as the integrated webcam of a laptop computing device. In other implementations, webcam 220 is separate from computer 210, and is configured to communicate with computer 210 through any suitable wireless and/or wired communication protocol. Headset 230 may include one or more speakers and one or more microphones to allow for the collection and transmission of audio data. In some implementations, functionality that would otherwise be provided by headset 230 can instead be provided through one or more speakers and one or microphones that are connected to computer 210 via any suitable wireless and/or wired communication protocol, or that are integrated into computer 210.

Client application 240 is a software application that runs on computer 210 and provides a user with access to the VTF. Client application 240 can, for example, enable a user to securely access a portal associated with her/his account, and to participate in the virtual communication environment maintained by VTF engine 136. In some implementations, client 240 is an executable application that is installed on computer 210. In such implementations, the user may run the application on computer 210 and access the VTF through the application. In other implementations, client 240 may be accessed through a webpage via a browser application. In such implementations, the user may navigate to a specific webpage that provides access to the VTF through a web-based application. In other implementations, client 240 may be accessed through another remote source.

In some instances, for example when the user is an authorized broker, the user may interact with the exchange computer system and the VTF through a Public Automated Routing (PAR) device 250. PAR device 250 provides a broker with secure remote access to exchange computer system 110, with similar functionality to the computing devices that are employed in a physical trading floor environment. For example, a broker's use of PAR device 250 creates an audit trail and automated surveillance in a similar fashion as if the broker were participating in the physical trading floor environment, so as to ensure compliance with applicable regulations and exchange rules. Similarly, a broker using PAR device 250 can perform actions similar to those by brokers in a physical trading floor environment. For example, an application running on the PAR device 250 can allow a broker to receive orders from clients, obtain market information (e.g., market rates available for securities, prices, and competition) and execute transactions on behalf of clients.

Figure 3A:
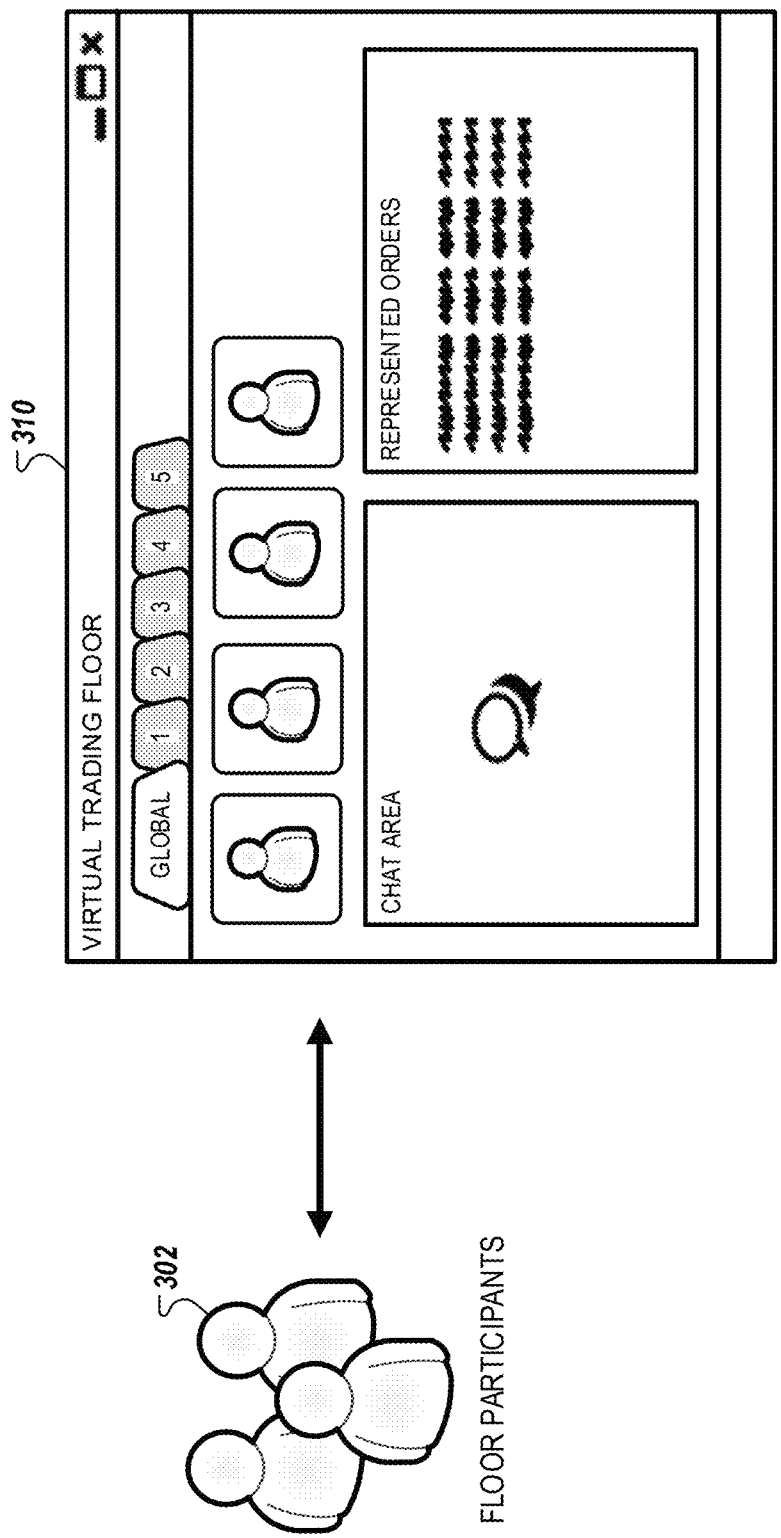
FIGS. 3A-3D are diagrams illustrating examples of users participating in a VTF.

FIGS. 3A-3D are diagrams illustrating examples of users participating in a VTF. Referring initially to FIG. 3A, each of a plurality of floor participants 302 log into a collaboration tool 310. Access to the collaboration tool may, for example, be provided to a particular user through a client 240 running on that user's computing device 210.

To log into the collaboration tool 310, a user initially authenticates himself/herself through a login interface. For example, the user may provide a username and password combination that is associated with an authorized account to obtain access to the conference client 240. In other examples, access to the conference client 240 can be conditioned on use of other types of authentication techniques, such as one-time passwords, and/or two-factor authentication, among others.

Once authenticated, the user can access a general lobby of the collaboration tool 310 that provides a global floor visual with audio, video, and/or text-based chat capabilities. An audio collaboration system accessible through the lobby may, for example, utilize a "push to talk" system by default. Breakout sessions for groups corresponding to specific locations on the VTF can be displayed in tabs along the top of the collaboration tool 310's user interface. In the example shown in FIG. 3A, one tab corresponds to the global floor session, while others enable users to transition to and/or participate in trading at particular virtual floor locations.

Figure 3B:
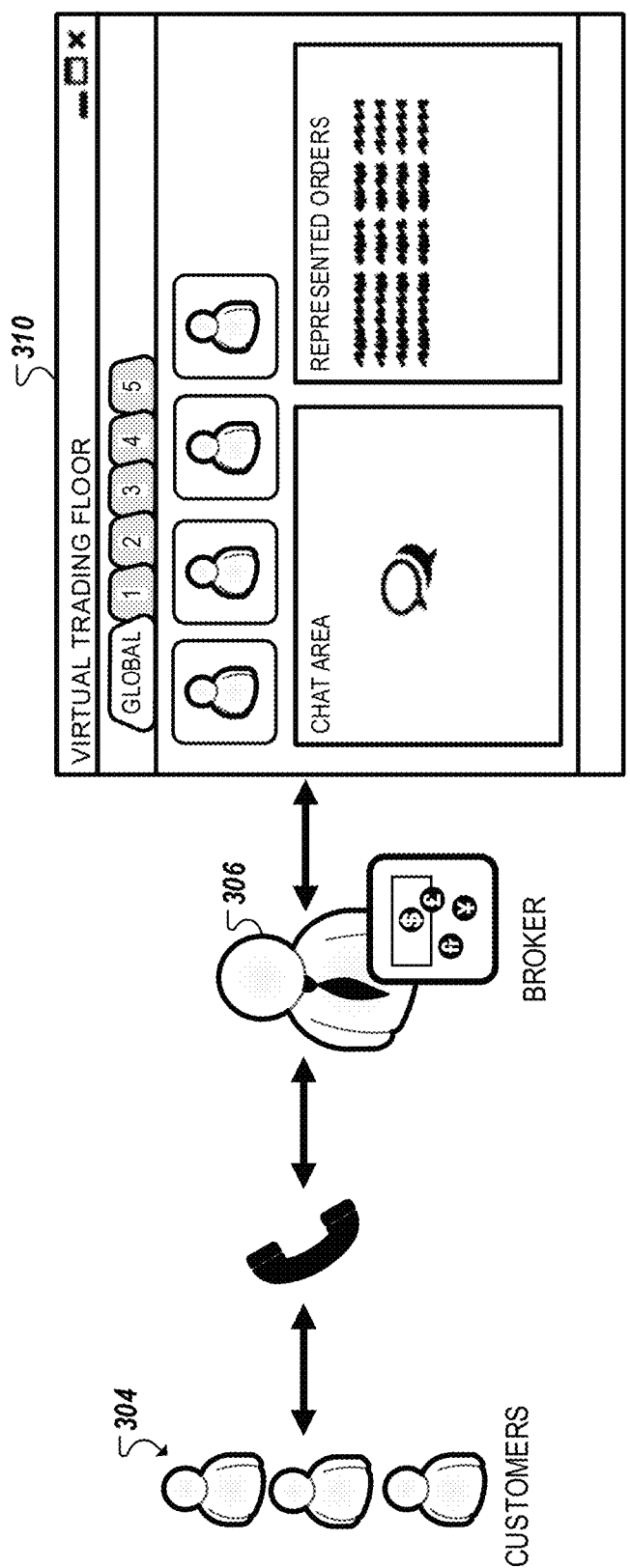

Referring now to FIG. 3B, a broker 306 receives one or more trade requests from a client and can use the collaboration tool 310 to initiate a call around. The broker 306 receives responses to the call around, and systematizes orders and contra-orders.

The broker 306 can connect to exchange computer system 110 via a secure connection (e.g., through a virtual private network (VPN)) to a PAR tool 320, which may be provided through an application running on a PAR device 250 that has been issued to the broker 306 by the exchange.

Figure 3C:
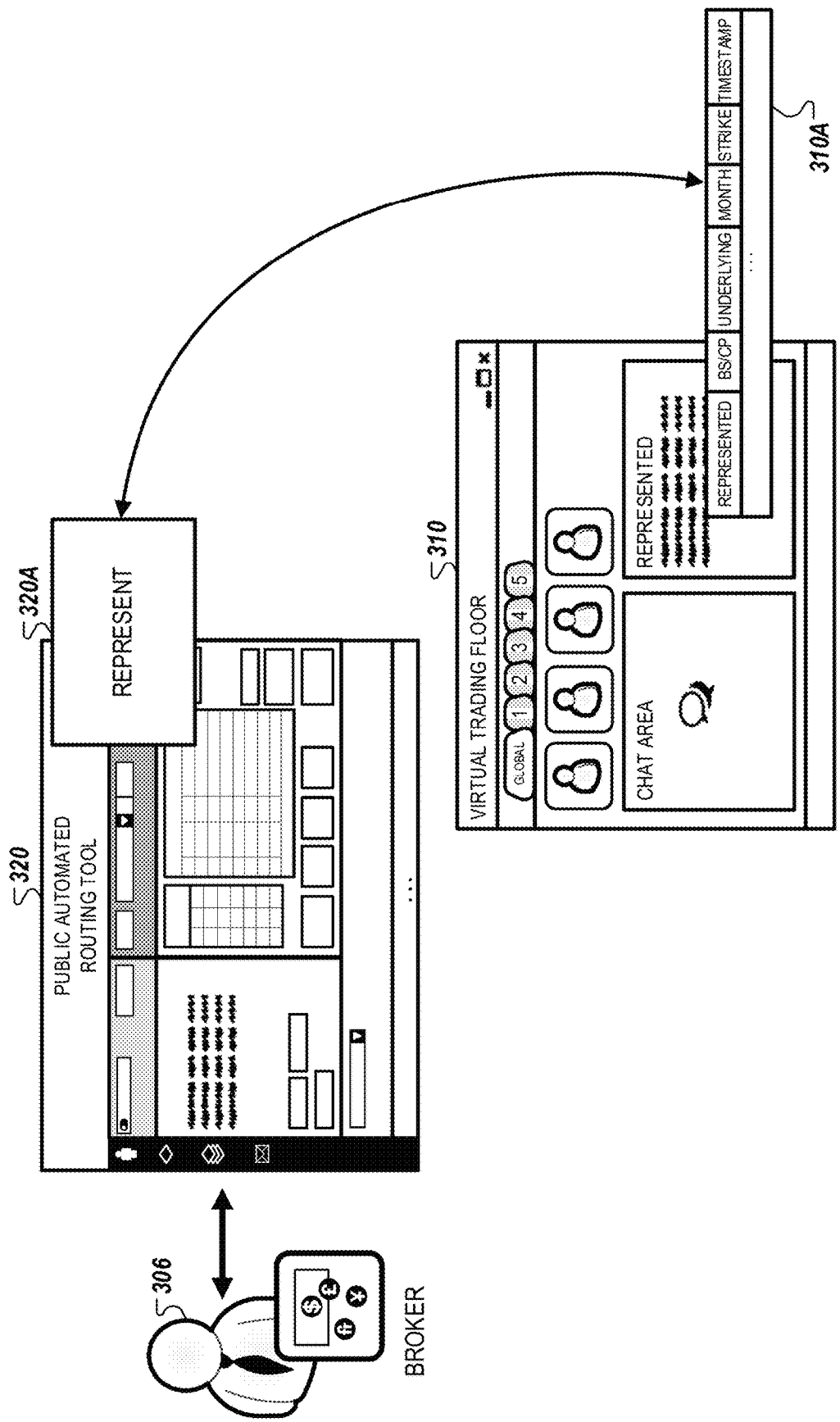
Figure 3D:
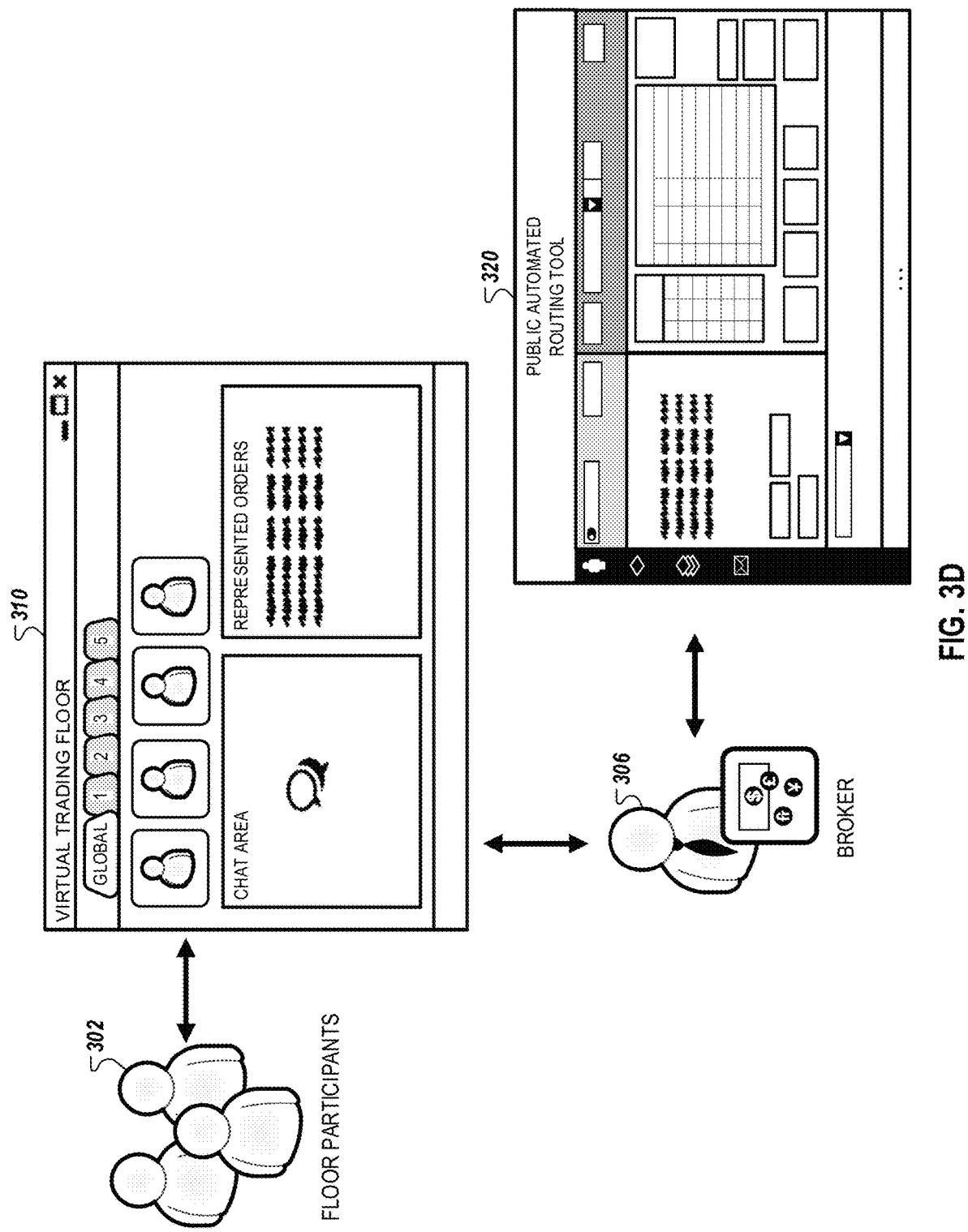

Referring now to FIGS. 3C and 3D, the PAR device of the broker 306 displays systematized orders with order details to buy/sell and contra-order information. The broker 306 can open an order from an order list and select a "REPRESENT" button 320A to represent that order to appropriate members of a crowd within the virtual open-outcry environment. Similar to a physical open-outcry environment, information 310A relating to order details is then shared/streamed in one or more virtual locations that are accessible to the broker 306 and to other authorized users of the collaboration tool 310. The information may identify, for example, a financial instrument, a side, a quantity, and a price.

Participants in the virtual trading floor may then respond to the represented order with their own interest, by video, voice, and/or text-based chat. In some implementations, participants are required to enter a reply via text-based chat within a reasonable time-frame, in order to be recognized with certainty. After responses are received, the broker 306 announces the trade, and finalizes the trade using the PAR tool 320. The exchange computer system 110 then facilitates the trade utilizing, for example, order matching system 134.

Figure 4A:
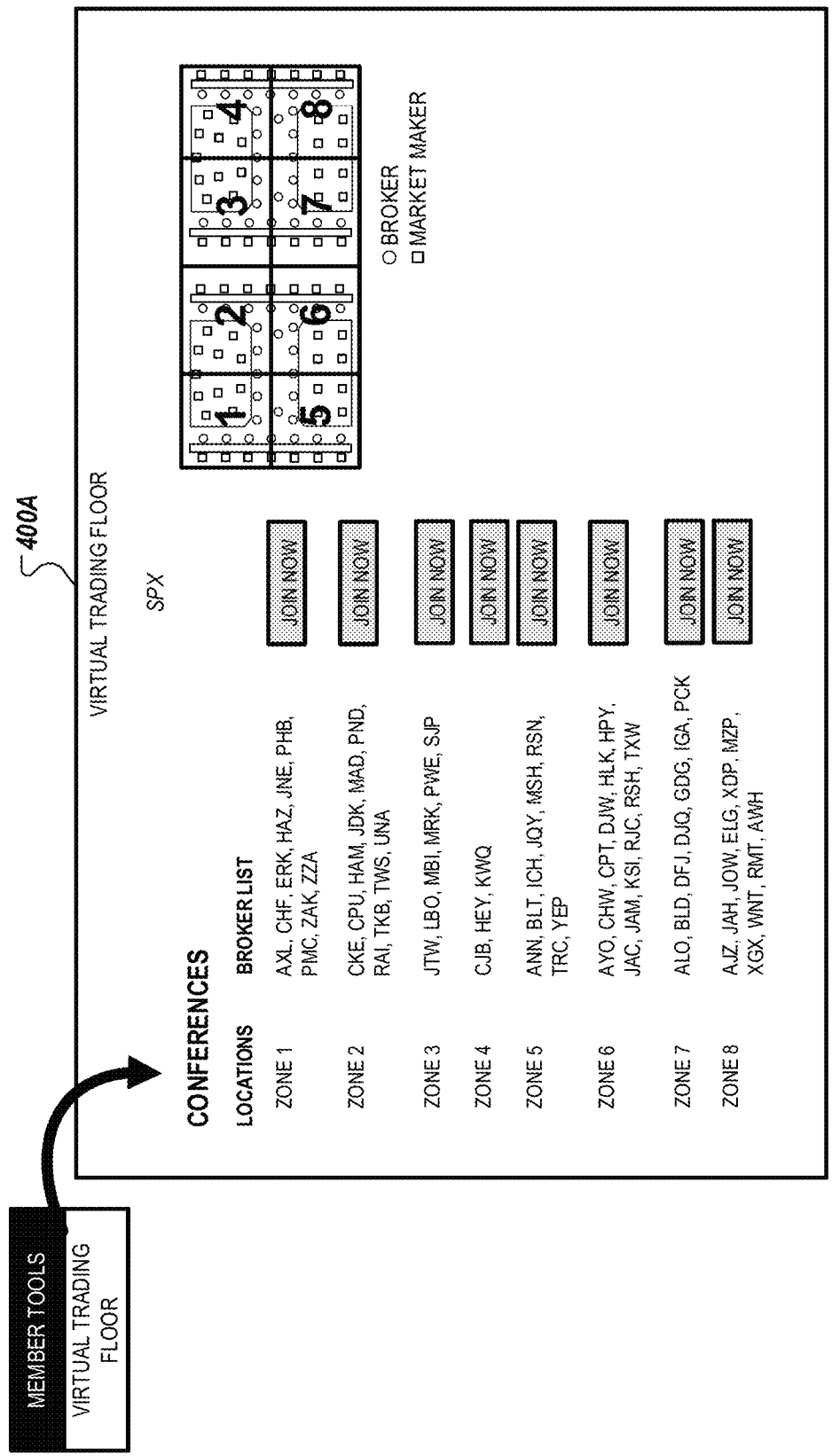

FIGS. 4A-4D are diagrams illustrating examples of users participating in a VTF. Referring initially to FIG. 4A, a user accessing a collaboration tool 310 provided by a client application 240 may view user interface 400A after logging into the collaboration tool 310 with their user credentials.

As illustrated in this example, interface 400A is a landing page that displays a list of ongoing VTF conferences that correspond to virtual locations or zones within the VTF. Each virtual location or zone may, for example, correspond to a specific location within an exchange's physical trading floor, and interface 400A may represent that correspondence to the user through a visual map, or by other 2D or 3D graphical means. In implementations involving a visualization of the VTF, the interface 400A may also indicate positions of various market participants (such as brokers and market makers) within the VTF. Depending on the permissions associated with the user's account, the landing page may provide a listing of VTF conferences that are available to the user to join. The permissions associated with a the user's account may, for example, correspond to one or more locations on an exchange's physical trading floor at which the user is authorized to trade.

In the example shown in FIG. 4A, the VTF has a floor map with eight zones that simulate a physical trading floor environment. Each zone has its own corresponding conference room that a user can access by selecting the "JOIN NOW" option. Each zone is also associated with a list of participating brokers and market makers. In some implementations, the user can freely move between conferences for which they are authorized by, for example, returning to the landing page and selecting a different conference.

Figure 4B:
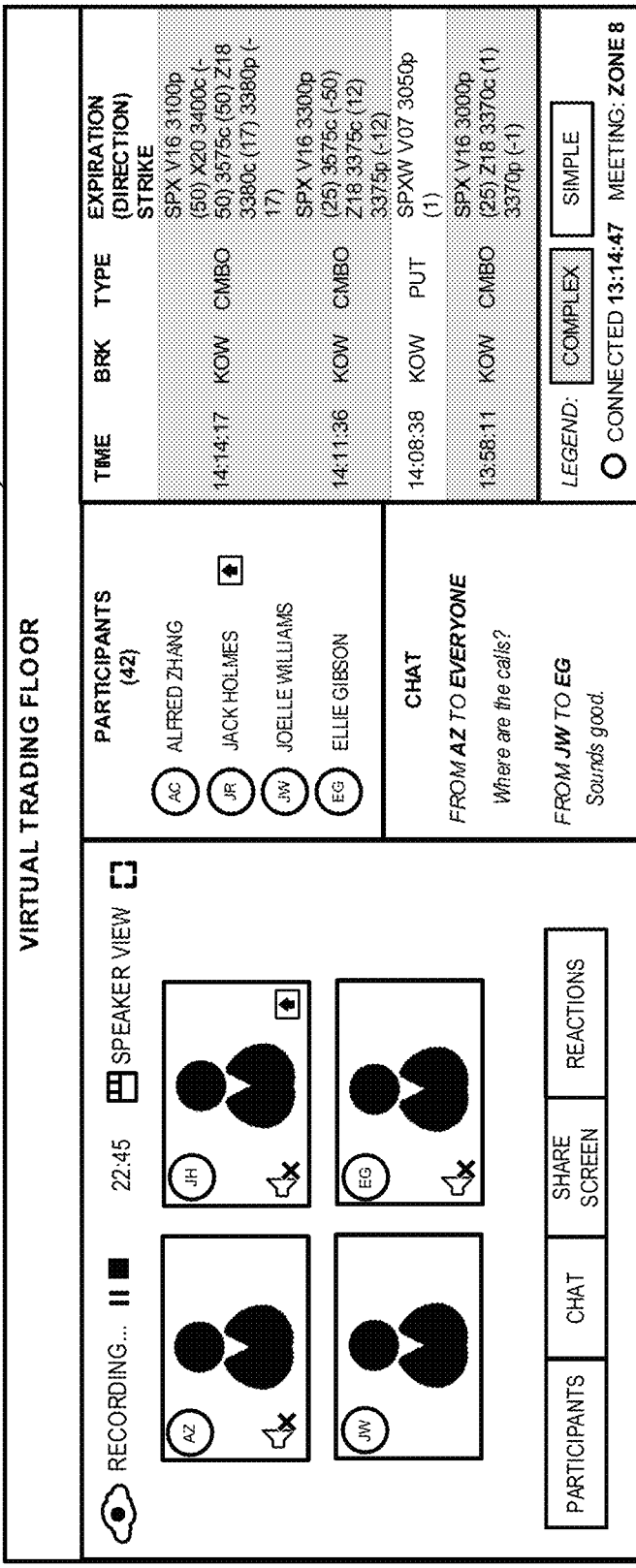

Referring now to FIG. 4B, a user accessing a specific conference within the VTF via collaboration tool 310 may be presented with a user interface 400B that provides an audio-visual portion 402B, a text-based chat portion 404B, and a trade blotter portion 406B.

The audio-visual portion 402B of the user interface 400B enables the user to interact with other market participants through live audio/video communications, in a manner similar to interactions that occur on physical trading floors. Video that is captured by the user's webcam 220 may, for example, be streamed to the user and to other members of the trading crowd who are present within the conference, thereby enabling the user to communicate through facial expressions and gestures.

Similarly, the audio-visual portion 402B of the user interface 400B enables the user to view the facial expressions and gestures of the other members. The user can thereby gather valuable information pertaining to ongoing trading activity within the VTF at a glance. The user can also focus on video streams corresponding to members who appear interested in particular trades, and can receive information pertaining to those trades by viewing displayed expression and gestures.

Another source of valuable information that may be communicated by the user, and made available to the user, through the audio-visual portion 402B of the user interface 400B is audio of ongoing trading activity occurring with the VTF. Audio captured by the user's headset 230 and/or other microphones may, for example, be streamed to the user and to other members of the trading crowd who are present within the conference, thereby enabling the user to communicate by voice or other audible signals. The audio-visual portion 402B of the user interface 400B may, for example, feature push-to-talk functionality that enables the user to transmit voice to other members of the trading crowd only when desired. Alternatively, the audio-visual portion 402B of the user interface 400B may enable the user to constantly transmit voice and other audio information.

The audio-visual portion 402B of the user interface 400B also enables the user to hear voice and other audio of the other members through speakers associated with computer 210 (for example, speakers of headset 230). The audio-visual portion 402B of the user interface 400B may, for example, provide audio streamed from another member that varies in volume depending on the relative position of the user to the other member within the virtual trading environment. In some implementations, the exchange computer system determines a volume for providing information relating to orders and/or responses to each of a plurality of market participants, based on the positions of the remote market participants within the virtual environment. In this and other ways, the clamor of the trading crowd may be effectively reduced, so as to enable the user to focus on relevant audio information.

In some implementations, the user may choose to enable or disable video and/or audio within the audio-visual portion 402B of user interface 400B, according to their own preferences. The user may, for example, choose to block their own video, or to view only video corresponding to selected participants. Similarly, the user may choose to mute their own audio, or to hear only audio corresponding to selected participants. In some implementations, video of all participants within a conference is by default enabled, and audio of all participants is by default disabled.

The chat portion 404B of the user interface 400B enables the user to communicate with other members of the trading crowd via text, emotes, status indicators, or other means. The user may, for example, transmit text to all members of the crowd, or to one or more specific members of their choosing. The user may, for example, provide a text-based response to an order, in addition to communicating that response by gesture and/or voice within the audio-visual portion 402B of the user interface 400B. The chat portion 404B of the user interface 400B may also provide a listing of members present within the conference, as well as search functionality enabling the user to identify and select one or more of those members.

The trade blotter portion 406B of the user interface 400B may provide a running record of trades made over a period of time (for example, one trading day), along with corresponding details of those trades. The details of a particular trade can include, for example, information such as time, price, order size, and order type.

In addition, or alternatively, trade blotter portion 406B of the user interface 400B may provide information pertaining to active orders and responses, including information such as time, price, order size, and order type. Trade blotter portion 406B can, for example, document orders so that they can be reviewed and confirmed by members participating in the conference. In that regard, the trade blotter portion 406B may provide a record of order details of orders that are audibly represented during a conference, and of orders that are represented by brokers who are participating in the conference using PAR devices.

In some implementations, the trade blotter portion 406B can be customized by the user according to their preferences, and/or on a conference-by-conference basis. The information displayed in trade blotter portion 406B may, for example, vary based on a type of financial instrument being traded within the conference, or other factors. In some implementations, the trade blotter portion 406B may display a request for quote (RFQ) trade blotter that provides electronic notifications to participating members who express interest in a specific strategy or financial instrument.

By combining the audio-visual portion 402B, text-based chat portion 404B, and trade blotter portion 406B into a single user interface 400B, the collaboration tool 310 that is described in the context of this and the above examples enables market participants who are remote from one another but connected to an ongoing VTF conference to electronically collaborate and exchange valuable trading information using methods that are similar to the methods employed by traders on a physical trading floor, but that take place within the virtual environment provided by the VTF engine 136.

Referring now to FIG. 4C, a user accessing a specific conference within the VTF may opt to view a trade blotter that is separate from, or additional to, the trade blotter presented in the trade blotter portion 406B of user interface 400B. As illustrated in FIG. 4C, the information presented in the trade blotter of user interface 400C may be similar to that presented in the trade blotter portion 406B of user interface 400B. The trade blotter of user interface 400C may, for example, provide a running record of trades made over a period of time, along with corresponding details of those trades. The details of a particular trade can include, for example, information such as time, price, order size, and order type. Notably, however, the trade blotter presented in user interface 400C may pertain to one or more additional conferences within the VTF, and/or to trading activity taking place outside of the VTF.

Figure 4D:

Referring now to FIG. 4D, a broker may interact with market participants within the VTF by representing orders using a PAR device (such as PAR device 250), in addition to connecting to the VTF through a client application (such as conference client 240 running on computer 210). An application running on the PAR device may, for example, provide a user interface 400D by which the broker can monitor trading activity and represent orders. The application may also allow a broker to receive orders from clients, obtain market information (e.g., market rates available for securities, prices, and competition), and execute transactions on behalf of clients.

FIG. 5 is a flowchart of an example process for implementing a trade through the VTF. Briefly, the process 500 includes maintaining a virtual environment that facilitates audio-visual interaction between a plurality of remote market participants (510), establishing a secure connection with a computing device (520), receiving information relating to a financial instrument transaction order (530), providing the information relating to the financial instrument transaction order to the plurality of remote market participants (540), receiving a response to the financial instrument transaction order from at least one remote market participant from among the plurality of remote market participants (550), providing information relating to the response to the plurality of remote market participants (560), and facilitating a transaction (570).

In more detail, the process 500 includes maintaining a virtual environment that facilitates audio-visual interaction between a plurality of remote market participants (510). For example, an exchange computer system 110 can maintain a virtual environment using a VTF engine 136 that facilitates audio-visual interaction between a plurality of market participants. The audio-visual interaction may, for example, take the form of that described above with respect to collaboration tool 310 provided by client application 240.

The process 500 includes establishing a secure connection with a computing device (520). For example, the exchange computer system 110 can establish a secure connection with a computing device of a market participant or a broker. The connection can be made by implementing security protocols and measures such that data identifying order or bid information, or parties placing orders or quotes, can be securely transmitted. For example, the secure connection can established using VPNs. A particular market participant may, for example, access the virtual environment maintained by VTF engine 136 through a client application running on a computing device, such as client application 240 running on computer 210.

The process 500 includes receiving information relating to a financial instrument transaction order (530). For example, the exchange computer system 110 can receive information relating to a financial instrument transaction order from the computing device of an exchange participant. The information can identify, for example, order or bid information, parties placing orders or quotes, or risk information. The participant may, for example, provide the information to the exchange computer system 110 through a user interface of collaboration tool 310, or through a PAR device 250. The PAR device 250 may, for example, be configured to enable the participant to interface with the exchange computer system 110 so as to remotely place orders on behalf of others in a similar fashion to a broker placing orders on a physical trading floor The process 500 includes providing the information relating to the financial instrument transaction order to the plurality of remote market participants (540). For example, the exchange computer system 110 can provide the information relating to the financial instrument transaction order to the plurality of remote market participants through a user interface of the collaboration tool 310. In some implementations, the information can be provided based on the virtual presence of each of the plurality of remote market participants at a specific location within the virtual environment. For example, as shown in FIG. 4A, the virtual environment of a VTF can be segmented into multiple conferences to simulate specific locations of a physical trading floor, and the information can be provided to participants in a particular conference.

The process 500 includes receiving a response to the financial instrument transaction order from at least one remote market participant from among the plurality of remote market participants (550). For example, the exchange computer system 110 may receive the response in the form of text, audio, or video information transmitted by a remote market participant through the virtual environment maintained by VTF engine 136. In some implementations, the response can include an action performed within the virtual environment by a virtual representative of the responding market participant.

The process 500 includes providing information relating to the response to the plurality of remote market participants (560). For example, the exchange computer system 110 may cause information relating to the response to be displayed within a graphical user interface of a teleconferencing application, such as a user interface provided through collaboration tool 310. The information may include an order time, an order type, an order price, an order expiration, a financial instrument symbol, and a market participant identifier.

The process 500 includes facilitating a transaction (570). For example, the exchange computer system 110 can facilitate a transaction based on the information relating to the financial instrument transaction order, the information relating to the response, and one or more order matching rules. As described throughout, remote market participants can interact through the VTF in a similar manner as traders on a physical trading floor, and the exchange computer system 110 may facilitate the transaction based on activity within the VTF.

The exchange computer system 110 may, for example, be a distributed computer system including an order routing system 132, an order matching system 134, and a virtual floor engine 136. In such implementations, the virtual floor engine 136 maintains the virtual environment that facilitates audio-visual interaction between the plurality of remote market participants, the order routing system 132 receives the information relating to the financial instrument transaction order and the information relating to the response, and forwards that information to the order matching system 134, and the order matching system 134 facilitates the transaction based on the forwarded information and one or more order matching rules.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A computer-implemented method for virtual floor trading between a plurality of participants using an exchange computer system, the method comprising:
   establishing, by the exchange computer system, a secure connection with a user computing device of a participant of the plurality of participants by providing a secure sockets layer (SSL) virtual private network (VPN) to enable interaction between the plurality of participants when accessed;
   receiving log-in credentials from the user computing device for the participant to determine an association between the user computing device and an account of the participant as an authorized market participant, wherein the user computing device is connected to one or more sensors to record speech and obtain instructions for movement sent by the user computing device to the exchange computer system;
   providing, by the exchange computer system, a first view of a virtual environment to be displayed at a first graphical user interface (GUI) at the user computing device of the participant of the plurality of participants, wherein the virtual environment corresponds to at least a portion of a physical environment of a trading floor for executing transactions, wherein the first view of the virtual environment is generated to include a visualization of a floor map that comprises one or more virtual trading zones of a plurality of virtual trading zones in the trading floor, wherein the one or more virtual trading zones are authorized to be accessed by the participant, wherein a virtual representative of the participant is moveable between locations within the one or more virtual trading zones;

assigning, using a coordinate system, coordinates to map virtual locations in the virtual environment to points in the physical environment of the trading floor, wherein the assigned coordinates on the coordinate system are usable to place and move participants at virtual locations within the virtual environment, wherein a size and shape of the virtual environment are generated based on i) executing a rule-base algorithm applying rules obtained from a database of the exchange computer system and ii) using a determined number of the plurality of participants connected to the exchange computer system;

receiving, by the exchange computer system and through interacting with the first GUI at the user computing device of the participant, an interaction to perform a movement of the participant within the virtual environment to reposition to a selected virtual trading zone of the one or more virtual trading zones from the first view;

providing for display at the user computing device of the participant, a second view including the virtual trading zone, wherein, based on repositioning of the participant to the virtual trading zone, identifying, using the coordinate system, a virtual location within the virtual trading zone such that the virtual representative of the participant interacts with virtual representatives of other participants associated with other virtual locations assigned to the other participants in the virtual trading zone through an audio-visual portion and a blotter portion, wherein the blotter portion provides a running record of transaction requests within the virtual trading zone.

2. The computer-implemented method of claim 1, wherein generating the audio-visual portion comprises:
receiving information relating to one or more security instruments specific to the selected virtual trading zone to which the participant has moved; and
displaying the information specific to the virtual trading zone on the blotter portion.

3. The computer-implemented method of claim 1, wherein the running record of the transaction requests from participants in the virtual trading zone comprises, for each transaction request, an order time, an order type, an order price, an order expiration, a security instrument symbol, and a market participant identifier.

4. The computer-implemented method of claim 1, wherein generating the audio-visual portion comprises generating a video feed of only one or more participants with accompanying audio during the interactions.

5. The computer-implemented method of claim 1, wherein the audio-visual portion is configured to allow the participant to select one or more characteristics of the virtual representative.

6. The computer-implemented method of claim 1, wherein the audio-visual portion is further configured to overlay an icon within the virtual environment on a representation of one or more other participants.

7. The computer-implemented method of claim 1, wherein the user computing device comprises a personal computer, a webcam, a headset, and a teleconferencing application, and wherein the teleconferencing application is configured to interface with the exchange computer system.

8. The computer-implemented method of claim 7, wherein the teleconferencing application is configured to receive a keyboard input, and to enable an action to be performed within the virtual environment in response to the keyboard input.

9. The computer-implemented method of claim 1, wherein establishing the secure connection comprises:
receiving the log-in credentials from the user computing device;
determining the association between the user computing device and the authorized market participant; and
establishing the virtual private network (VPN) connection between the user computing device and the exchange computer system.

10. The computer-implemented method of claim 1, wherein the virtual environment comprises a three-dimensional graphical environment.

11. The computer-implemented method of claim 1, wherein the virtual representative of the participant interacts with virtual representatives of other participants associated with other virtual locations assigned to the other participants in the selected virtual trading zone through a texting portion that allows the participant to chat with one or more participants in the virtual environment.

12. The computer-implemented method of claim 1, wherein the user computing devices run a virtual trading floor (VTF) engine of the exchange computer system, wherein presenting, in the virtual environment, the first GUI comprises:
obtaining, by the VTF of each user computing device of each participant of the plurality of participants, information from participants connected to the user computing devices; and
translating the information into the virtual environment to facilitate real-time trading interaction between the plurality of participants.

13. The computer-implemented method of claim 1, wherein providing the second view comprises:
generating the audio-visual portion to include audio data or video data received by the exchanged computer system from at least one of microphones, cameras, gyroscopes, and sensors on user computing devices of each participant in the virtual trading zone;
determining a sound volume for providing the audio data to participants in the virtual trading zone based on virtual locations, the sound volume being determined to reduce a clamor from participants in the virtual environment; and
providing the audio-visual portion to the user computing device of the participant.

14. The computer-implemented method of claim 1, comprising:
in response to receiving an order from the participant, the order being determined to be designated to the exchange computer system, providing the order to other participants of the plurality of participants and processing the order according to matching rules stored in a first database to determine a matching order to the received order, the matching order being determined from one or more provided orders by one or more of the plurality of participants, wherein processing the order is configured to facilitate a transaction execution based on information related to the received order, information related to the matching order, and one or more of the matching rules.

\* \* \* \* \*